Nov. 28, 1944.   M. H. RHODES   2,363,993
ESCAPEMENT
Filed Dec. 12, 1940

Marcus H. Rhodes,
Inventor.
Haynes and Koenig
Attorneys.

Patented Nov. 28, 1944

2,363,993

UNITED STATES PATENT OFFICE 2,363,993

ESCAPEMENT

Marcus H. Rhodes, Hartford, Conn., assignor to M. H. Rhodes, Inc., Hartford, Conn., a corporation of Delaware Application December 12, 1940, Serial No. 369,693

1 Claim. (Cl. 58—117)

This invention relates to escapements, and with regard to certain more specific features, to impulse escapements.

Among the several objects of the invention may be noted the provision of an escapement for controlling gear trains and the like which is independent in operation of the character of the finish on the escapement teeth and in which a quiet and smoothly acting recessive wiping contact is attained; the provision of an escapement which may be made at less cost; and the provision of escapement apparatus which is characterized by quietness and a large angle of action of the balance staff. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
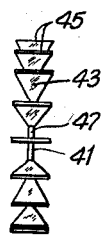
Figure 2:
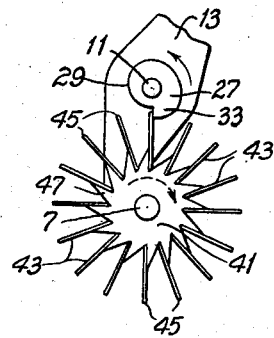
Figure 3:
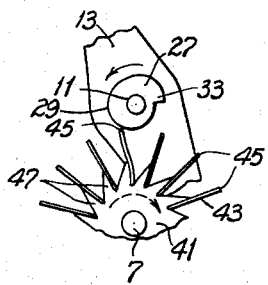
Figure 4:
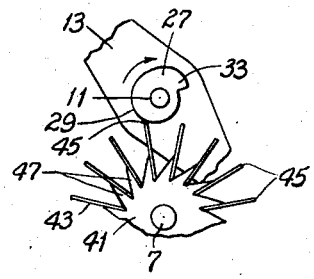

In the accompanying drawing, in which are illustrated several of various possible embodiments of the invention, Fig. 1 is an end view of an escapement wheel of the invention;

Fig. 2 is an end view of the wheel of Fig. 1, showing its application to an escapement means on a balance shaft; and, Figs. 3 and 4 are fragmentary views showing alternative positions of the parts of Fig. 2.

Similar reference characters indicate corresponding parts throughout the several views of the drawing.

The escapement wheel carried on the shaft 7 is made up as a thin central hub 41. The escapement teeth 43 are stamped out and formed up as shown to provide thin, flat, springing or resilient, paddle-like cantilever teeth. Since the blank from which the teeth are shaped is thin and composed of a springy material such as springy sheet metal, the teeth are likewise springy or resilient. These teeth cooperate at edges 45 with the escapement member 27 which is formed with the extension 33 and braking surface 29. Member 27 is located upon the balance shaft 11 with which is associated the balance member 13. It will be understood that a hair spring or similar spring is used in connection with the shaft 11, and that a suitable driving means is used in connection with the shaft 7. Operation is as follows, starting with Fig. 2:

A springing tooth 43 engages the extension 33 (Fig. 2) to move 27 counterclockwise, thus bringing the braking surface 29 into position where it will be approached by an edge 45 of the succeeding tooth 43, as shown in Fig. 3. Then as said edge 45 of the succeeding tooth 43 engages said braking surface 29, counterclockwise motion is resisted. The tooth tends to spring back or function resiliently so that quiet action is attained. This result is aided by the fact that the end of the tooth is long and flat. The deflection due to springiness is exaggerated in Fig. 3 but there is deflection.

The triangular shape of the plane of each of the teeth 43 provides the outer relatively long edge 45 which is parallel to the axis of the wheel, and also provides at the inner apex a point of attachment at 47 which is relatively narrower, so that maximum springing effect is obtained. The long edge 45, as indicated in Fig. 1, admits of considerable variation in the position of the plane of the hub 41 with respect to the plane of the escapement member 27, thereby reducing the accuracy of manufacture required in this particular, and thus reducing manufacturing cost.

Another advantage of the springing teeth is that they approach the extension 33 with a quick action when they move from the brake surface 29, so that the counterclockwise rotation of the member 27 is accelerated promptly. The flexing of the teeth not only takes up shock and dissipates noise, but also stores up energy that effects said prompt reversal of motion of the member 27. It is always desirable that the member such as 27 and the balance wheel attached thereto travel in a counterclockwise direction over as great an angle as possible, because the further this rotation proceeds the longer it takes it to occur, and correspondingly the longer it takes to return clockwise for the next release action. In other words the oscillating arc of 27 is desirably increased, which delays the running down of the apparatus for a given tension of hair spring.

Another advantage of having the member 27 oscillate through as great an arc as possible is to deliver as much energy as possible to the hair spring or similar spring associated with the shaft 11. Thus this hair spring is finally in a much more taut condition and better able to start the balance wheel in reverse direction (clockwise) against the friction of the next tooth 43 on the brake surface 29.

Another advantage of the invention is that the sliding action in recess is along a substantially radial line on the staff, or, along a line closely approximating such a radial line. By action in recess is meant herein action between the teeth 43 and the staff parts after the center line has been passed, drawn between the center of the shaft 7 and the center of the staff 11. The structure of the present invention likewise imparts a greater impulse to the member 27. The pallet member 33 is in contact with a given tooth for a longer period of time, receives a greater impulse, and exercises a more powerful winding action upon the hair spring, thereby making possible the advantageous results referred to.

While a spiral type of vibrating hair spring may be used, it will be understood that other springs may be used for the purpose of vibrating or oscillating back and forth balance staff 11.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

An escapement wheel comprising a hub portion, peripherally located teeth on said hub portion, each of which teeth is characterized as a plane of resilient material, each tooth being of triangular shape with an outside edge arranged substantially parallel to the axis of the wheel and an inner apex forming an attachment with said hub portion.

MARCUS H. RHODES.